United States Patent
Shimada et al.

(10) Patent No.: US 10,530,283 B2
(45) Date of Patent: Jan. 7, 2020

(54) MOTOR CONTROLLER AND CONTROL METHOD FOR STEPPING MOTOR

(71) Applicant: Minebea Mitsumi Inc., Nagano (JP)

(72) Inventors: Ayaka Shimada, Fukuroi (JP); Takayuki Matsui, Toyohashi (JP); Kazuo Takada, Kosai (JP); Haruka Miyaji, Toyohashi (JP); Hideo Sano, Saitama (JP)

(73) Assignee: MINEBEA MITSUMI INC., Nagano (JP)

( * ) Notice: Subject to any disclaimer, the term of this patent is extended or adjusted under 35 U.S.C. 154(b) by 0 days.

(21) Appl. No.: 15/934,281

(22) Filed: Mar. 23, 2018

(65) Prior Publication Data

US 2018/0287532 A1    Oct. 4, 2018

(30) Foreign Application Priority Data

Mar. 28, 2017    (JP) .................. 2017-063803

(51) Int. Cl.
| | |
|---|---|
| *H02P 8/38* | (2006.01) |
| *H02P 8/34* | (2006.01) |
| *H02P 8/10* | (2006.01) |
| *H02P 8/08* | (2006.01) |
| *H02P 6/182* | (2016.01) |
| *H02P 29/60* | (2016.01) |

(52) U.S. Cl.
CPC .............. *H02P 8/10* (2013.01); *H02P 6/182* (2013.01); *H02P 8/08* (2013.01); *H02P 8/38* (2013.01); *H02P 29/60* (2016.02)

(58) Field of Classification Search
CPC ....................................................... H02P 8/00
USPC .................................................. 318/685, 696
See application file for complete search history.

(56) References Cited

U.S. PATENT DOCUMENTS

| | | | | |
|---|---|---|---|---|
| 3,958,164 A | * | 5/1976 | Hess ...................... | H02H 11/00 318/431 |
| 4,356,439 A | * | 10/1982 | Mott .................. | G05D 23/1917 318/603 |
| 5,929,589 A | | 7/1999 | Suzuki et al. | |

(Continued)

FOREIGN PATENT DOCUMENTS

| | | |
|---|---|---|
| JP | 07-170790 A | 7/1995 |
| JP | 10-146096 A | 5/1998 |

(Continued)

OTHER PUBLICATIONS

Japanese Office Action dated Jul. 29, 2019 for corresponding Japanese Application No. 2017-063803 and English translation.

*Primary Examiner* — Bentsu Ro
(74) *Attorney, Agent, or Firm* — Pearne & Gordon LLP (57) ABSTRACT

A motor controller capable of more reliably starting a stepping motor even if a predetermined drive power is supplied to the stepping motor, and to a control method for the stepping motor is provided. The motor controller driving a stepping motor detects that the stepping motor is in a step-out state after a start operation of the stepping motor is performed. If predetermined determination conditions are satisfied, when it is detected that the stepping motor is in a step-out state, it is determined that a restart operation of the stepping motor is performed, and the stepping motor is restarted.

8 Claims, 6 Drawing Sheets

(56) References Cited

U.S. PATENT DOCUMENTS

| | | | |
|---|---|---|---|
| 6,194,865 B1 * | 2/2001 | Mitsui | B60L 15/025 318/139 |
| 2014/0176039 A1 * | 6/2014 | Takada | H02P 8/38 318/696 |
| 2014/0203748 A1 | 7/2014 | Takada et al. | |
| 2015/0042258 A1 | 2/2015 | Takada et al. | |
| 2016/0118919 A1 | 4/2016 | Malone et al. | |

FOREIGN PATENT DOCUMENTS

| | | |
|---|---|---|
| JP | 2014-128070 A | 7/2014 |
| JP | 2014-143775 A | 8/2014 |
| JP | 2015-035926 A | 2/2015 |
| KR | 101095319 B1 | 12/2011 |

* cited by examiner

MOTOR CONTROLLER AND CONTROL METHOD FOR STEPPING MOTOR

CROSS REFERENCE TO RELATED APPLICATIONS

This application claims the benefit of Japanese Patent Application No. 2017-063803, filed Mar. 28, 2017, which is hereby incorporated by reference in its entirety.

BACKGROUND

Technical Field

The present disclosure relates to a motor controller and a method of controlling a stepping motor, and more particularly to a motor controller for use in an actuator and a method of controlling a stepping motor.

Background

The stepping motor has various features such as ease of control of the stepping motor and is widely used as multiple types of actuator (for example, see Japanese Patent Application Laid-Open No. H07-170790).

Examples of the actuator including a motor such as a stepping motor include an actuator for vehicular use in a low temperature environment such as in a place where the temperature is low. When the actuator is in such a low temperature environment, the lubricating oil applied to a drive unit of the actuator is accordingly hardened. When the actuator fallen into such a state is to be started, even if an effort is being made to operate the motor driving the actuator with a torque during steady operation (referred to as a state where the motor is in normal operation after the actuator started in a low temperature environment), the actuator cannot start, and a step-out may be detected.

In view of such a problem, Japanese Patent Application Laid-Open No. 2014-143775 discloses a motor controller capable of driving the motor even in a low temperature environment by performing boost control of drive power so that a drive power larger than that during steady drive is supplied to the motor only during the boost period after the motor started.

The drive method disclosed in Japanese Patent Application Laid-Open No. 2014-143775 requires a drive power larger than that during steady drive to be supplied to the motor during boost period. However, in some cases, the motor may be required to be driven by a predetermined drive power smaller than such a large drive power.

SUMMARY

The present disclosure is related to providing a motor controller capable of more reliably starting a stepping motor even if a predetermined drive power is supplied to the stepping motor, and to a control method for the stepping motor.

In accordance with one aspect of the present disclosure, a motor controller driving a stepping motor includes a step-out state detection unit configured to detect that the stepping motor is in a step-out state after a start operation of the stepping motor is performed, a restart determination unit configured to determine whether or not to perform a restart operation of the stepping motor based on predetermined determination conditions when the step-out state detection unit detects that the stepping motor is in a step-out state, and a restart control unit configured to control so as to perform the restart operation of the stepping motor when the restart determination unit determines to perform the restart operation.

Preferably the motor controller further includes a back electromotive voltage measuring unit configured to measure a back electromotive voltage induced in an unenergized coil of coils of a plurality of phases of the stepping motor, wherein the step-out state detection unit detects that the stepping motor is in a step-out state based on a measurement result of the back electromotive voltage by the back electromotive voltage measuring unit.

Preferably the motor controller further includes a step-out position calculation unit configured to calculate a position wherein the stepping motor is in a step-out state when the step-out state detection unit detects that the stepping motor is in a step-out state after the start operation of the stepping motor is performed, wherein the determination conditions of the restart determination unit include a condition wherein a distance from an initial position of the start operation of the stepping motor to a position where the stepping motor is in a step-out state, the position being calculated by the step-out position calculation unit, is within a predetermined distance.

Preferably the motor controller further includes a temperature measuring unit configured to measure a temperature of an object driven by the stepping motor or a temperature corresponding to the temperature of the object, wherein the determination conditions of the restart determination unit include a condition wherein the temperature measured by the temperature measuring unit is lower than a preset temperature.

Preferably the motor controller further includes an input voltage measuring unit configured to measure an input voltage inputted to the motor controller, wherein the determination conditions of the restart determination unit include a condition wherein the input voltage of the motor controller measured by the input voltage measuring unit is equal to or less than a predetermined voltage.

Preferably the determination conditions of the restart determination unit include a condition wherein the number of restart operation performed for the stepping motor by the restart control unit is equal to or less than a predetermined number.

Preferably the restart control unit exercises control so that the stepping motor moves to a predetermined restart position before the restart operation of the stepping motor is performed.

Preferably the restart position is the initial position of the start operation of the stepping motor.

In accordance with another aspect of the present disclosure, a method of controlling a stepping motor includes a step-out state detection step of detecting that the stepping motor is in a step-out state after a start operation of the stepping motor is performed, a restart determination step of determining whether or not to perform a restart operation of the stepping motor based on predetermined determination conditions when the step-out state detection step detects that the stepping motor is in a step-out state, and a restart control step of controlling to perform the restart operation of the stepping motor when the restart determination step determines to perform the restart operation.

The present disclosure can provide a motor controller capable of more reliably starting a stepping motor even if a predetermined drive power is supplied to the stepping motor, and a control method for the stepping motor.

DETAILED DESCRIPTION

Hereinafter, a motor controller according to an embodiment of the present disclosure will be described.

The motor controller is used, for example, to drive a stepping motor having coils of a plurality of phases. In order to drive the stepping motor, the motor controller controls a conductive state of a coil of each phase. In the present embodiment, the motor controller includes a drive circuit configured to supply power to coils of the stepping motor and a motor control circuit configured to control the drive circuit.

The actuator includes the motor controller, the stepping motor driven by the motor controller, and other mechanical components. In the actuator, the stepping motor is driven by drive power supplied from the drive circuit. In the actuator, the motor controller controls driving of the stepping motor by controlling the drive circuit.

Embodiments

Figure 1:
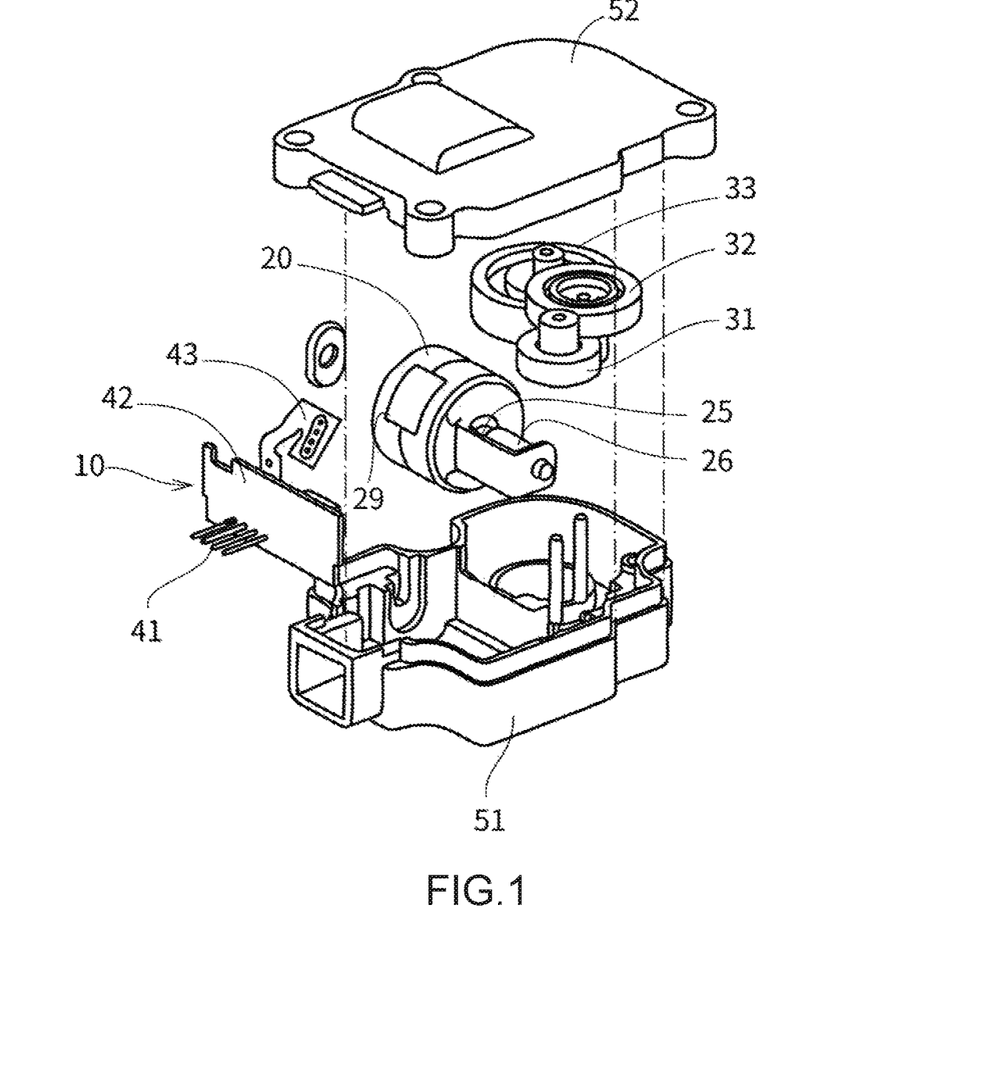
FIG. 1 is an exploded perspective view illustrating an example of an actuator including a motor controller according to an embodiment of the present disclosure.

FIG. 1 is an exploded perspective view illustrating an example of the actuator including the motor controller according to an embodiment of the present disclosure.

As illustrated in FIG. 1, the actuator 1 is covered with a casing 51 and a cover 52. The actuator 1 includes therein a motor controller 10, a stepping motor 20, a secondary gear 31, a tertiary gear 32, an output gear 33, and other components. An external output gear disposed in the output gear 33 is exposed from a bottom surface of the casing 51, and through this external output gear, a driving power of the actuator 1 is transmitted outside.

The stepping motor 20 generates the driving power of the actuator 1. A primary gear 26 is attached to an output shaft 25 of the stepping motor 20. The primary gear 26 of the stepping motor 20 meshes with the secondary gear 31. The secondary gear 31 meshes with the tertiary gear 32. The tertiary gear 32 meshes with the output gear 33.

The motor controller 10 includes a printed circuit board 42, a flexible printed circuit board 43 connecting the printed circuit board 42 and a motor terminal 29 of the stepping motor 20, and the like. The printed circuit board 42 includes therein a drive circuit 14 (illustrated in FIG. 2) configured to drive the stepping motor 20 and a motor control circuit 12 (illustrated in FIG. 2) configured to control the stepping motor 20. The printed circuit board 42 includes an external connection terminal 41 exposed to the outside of the casing 51 and the cover 52. The motor controller 10 operates when a voltage is inputted to the motor controller 10 from outside through the external connection terminal 41 or when an instruction signal is received from an external device.

In response to the input voltage, the motor controller 10 supplies a drive power to the stepping motor 20 to drive the stepping motor 20. As the stepping motor 20 is driven, the primary gear 26 rotates together with the output shaft 25. The driving power for rotation is transmitted to the secondary gear 31, the tertiary gear 32, the output gear 33, and the external output gear in this order, and then is outputted to the outside through the external output gear.

Note that for example, only the drive circuit 14 may be housed in the casing 51 and the cover 52. In this case, the motor controller 10 may be configured to include the drive circuit 14 housed in the casing 51 and the cover 52, and the external motor control circuit 12 connected to the drive circuit 14.

Figure 2:
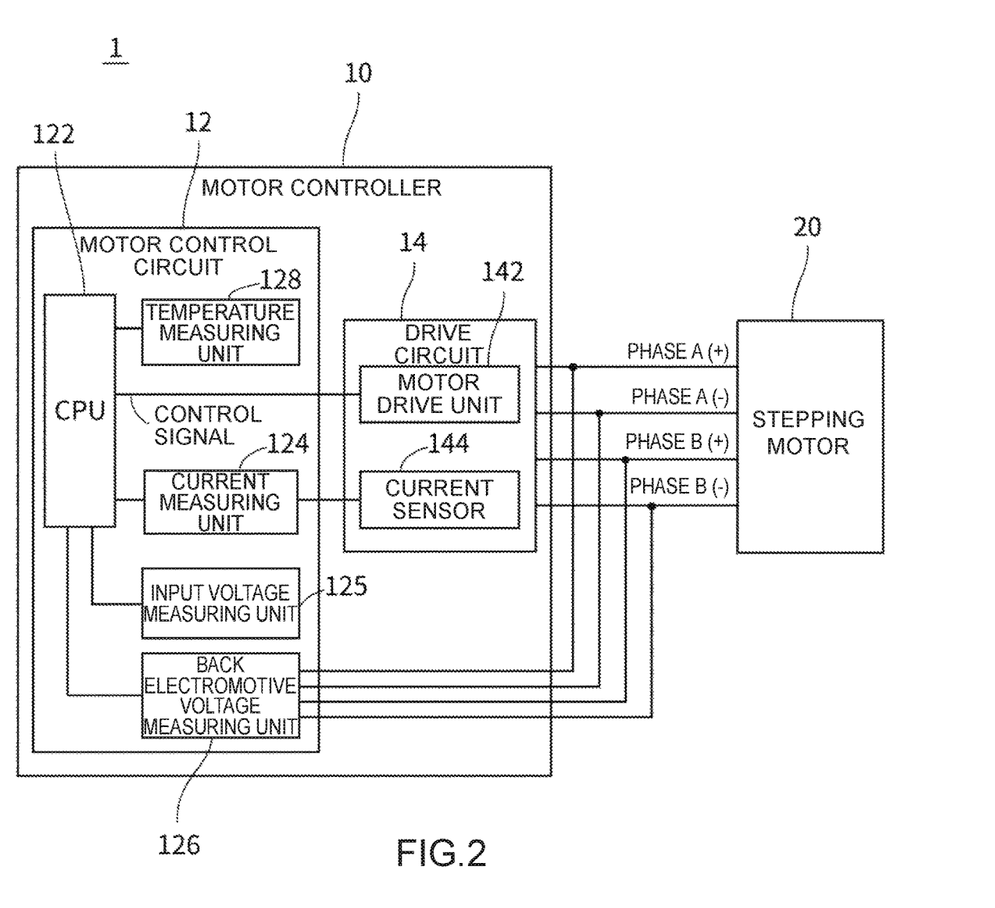
FIG. 2 is a block diagram of a motor and a motor controller constituting the actuator according to the embodiment of the present disclosure.

FIG. 2 is a block diagram of a motor and a motor controller constituting the actuator according to the embodiment of the present disclosure.

As illustrated in FIG. 2, the actuator 1 includes the motor controller 10 and the stepping motor 20. The stepping motor 20 is driven, for example, by two-phase excitation of phase A and phase B. The stepping motor 20 includes a coil of phase A and a coil of phase B (illustrated in FIG. 3). The stepping motor 20 is driven by drive power supplied from the motor controller 10 to the coil of each phase. Examples of application of the actuator 1 include an air conditioner installed in a vehicle. However, the application of the stepping motor 20 and the actuator 1 is not limited to this.

The motor controller 10 includes the motor control circuit 12 and the drive circuit 14. As described later, the motor controller 10 includes a step-out state detection unit configured to detect that the stepping motor 20 is in a step-out state after a start operation of the stepping motor 20 is performed, a restart determination unit configured to determine whether or not to perform a restart operation of the stepping motor 20 based on predetermined determination conditions when the step-out state detection unit detects that the stepping motor 20 is in a step-out state, and a restart control unit configured to control so as to perform the restart operation of the stepping motor 20 when the restart determination unit determines to perform the restart operation. In addition, the motor controller 10 further includes a step-out position calculation unit configured to calculate a position where the stepping motor 20 is in a step-out state when the step-out state detection unit detects that the stepping motor 20 is in a step-out state after the start operation of the stepping motor 20 is performed, wherein the determination conditions of the restart determination unit include a condition wherein a distance from an initial position of the start operation of the stepping motor 20 to a position where the stepping motor 20 is in a step-out state, the position being calculated by the step-out position calculation unit, is within a predetermined distance. In addition, the restart control unit exerts control so that the stepping motor 20 moves to a predetermined restart position before the restart operation of the stepping motor 20 is performed.

The drive circuit 14 includes a motor drive unit 142 and a current sensor 144. The drive circuit 14 supplies drive power to the stepping motor 20 to drive the stepping motor 20.

The motor control circuit 12 includes a CPU (central processing unit; an example of the step-out state detection unit, an example of the determination unit, an example of the restart control unit, and an example of the step-out position calculation unit) 122, a current measuring unit 124, an input voltage measuring unit 125, a back electromotive voltage measuring unit 126, and a temperature measuring unit 128. The motor control circuit 12 controls driving of the stepping motor 20 by controlling the drive circuit 14. In the present embodiment, the motor control circuit 12 is packaged as an IC (integrated circuit), but is not limited to this.

The motor drive unit 142 applies a voltage to the coil of each phase of the stepping motor 20. The motor drive unit 142 receives a control signal from the CPU 122. The motor drive unit 142 applies a voltage based on the control signal. In the present embodiment, the drive circuit 14 and the stepping motor 20 are connected by four lines: a line for a positive electrode of phase A (+), a line for a negative electrode of phase A (−), a line for a positive electrode of phase B (+), and a line for a negative electrode of phase B (−). The motor drive unit 142 supplies drive power to the stepping motor 20 through each of these lines according to the control signal. The control signal is a PWM signal, and the drive power changes according to the duty ratio of the PWM signal.

The current sensor 144 detects a current (coil current) flowing in the coil of each phase of the stepping motor 20. The current sensor 144 outputs the detection results of the coil current to the current measuring unit 124.

The current measuring unit 124 measures the coil current of the stepping motor 20. The current measuring unit 124 receives the detection results of the coil current from the current sensor 144. The current measuring unit 124 measures the coil current based on the detection results of the received coil current. The current measuring unit 124 outputs the measurement results of the coil current to the CPU 122.

The input voltage measuring unit 125 measures an input voltage inputted to the motor controller 10. The input voltage measuring unit 125 outputs the measurement results of the input voltage to the CPU 122.

The back electromotive voltage measuring unit 126 measures a back electromotive voltage induced in an unenergized coil of the coils of a plurality of phases of the stepping motor 20. In the present embodiment, the back electromotive voltage measuring unit 126 is connected to each of the four lines connecting the drive circuit 14 and the stepping motor 20. The back electromotive voltage measuring unit 126 outputs the measurement results of the back electromotive voltage to the CPU 122.

The temperature measuring unit 128 measures a temperature of an object driven by the stepping motor 20, i.e., a temperature of the actuator 1, or a temperature corresponding to the temperature of the actuator 1. Examples of the temperature measuring unit 128 include a temperature sensor measuring the temperature inside the IC of the motor control circuit 12. The temperature inside the IC of the motor control circuit 12 is the temperature corresponding to the temperature of the actuator 1. The temperature measuring unit 128 outputs temperature information indicating the temperature of the motor control circuit 12 to the CPU 122.

The CPU 122 receives the measurement results of the coil current outputted from the current measuring unit 124, the measurement results of the input voltage outputted from the input voltage measuring unit 125, the measurement results of the temperature outputted from the temperature measuring unit 128, and the measurement results of the back electromotive voltage outputted from the back electromotive voltage measuring unit 126.

In the present embodiment, after the start operation of the stepping motor 20 is performed, the CPU 122, which is acting as the step-out state detection unit, detects that the stepping motor 20 is in a step-out state based on the measurement results of the back electromotive voltage by the back electromotive voltage measuring unit 126. Specifically, the CPU 122 detects that the stepping motor 20 is in a step-out state by comparing a predetermined detection threshold and a value of the back electromotive voltage outputted from the back electromotive voltage measuring unit 126 if the stepping motor 20 is in the step-out state.

When the CPU 122 detects that the stepping motor 20 is in a step-out state, the CPU 122 generates a control signal according to the detection results and outputs the generated control signal to the motor drive unit 142. When it is detected that the stepping motor 20 is in a step-out state, the CPU 122 performs control such as stopping the stepping motor 20, for example, by ceasing to output the drive signal from the motor drive unit 142 to the stepping motor 20. Note that the detailed operation of the CPU 122 when it is detected that the stepping motor 20 is in a step-out state will be described later.

Figure 3:
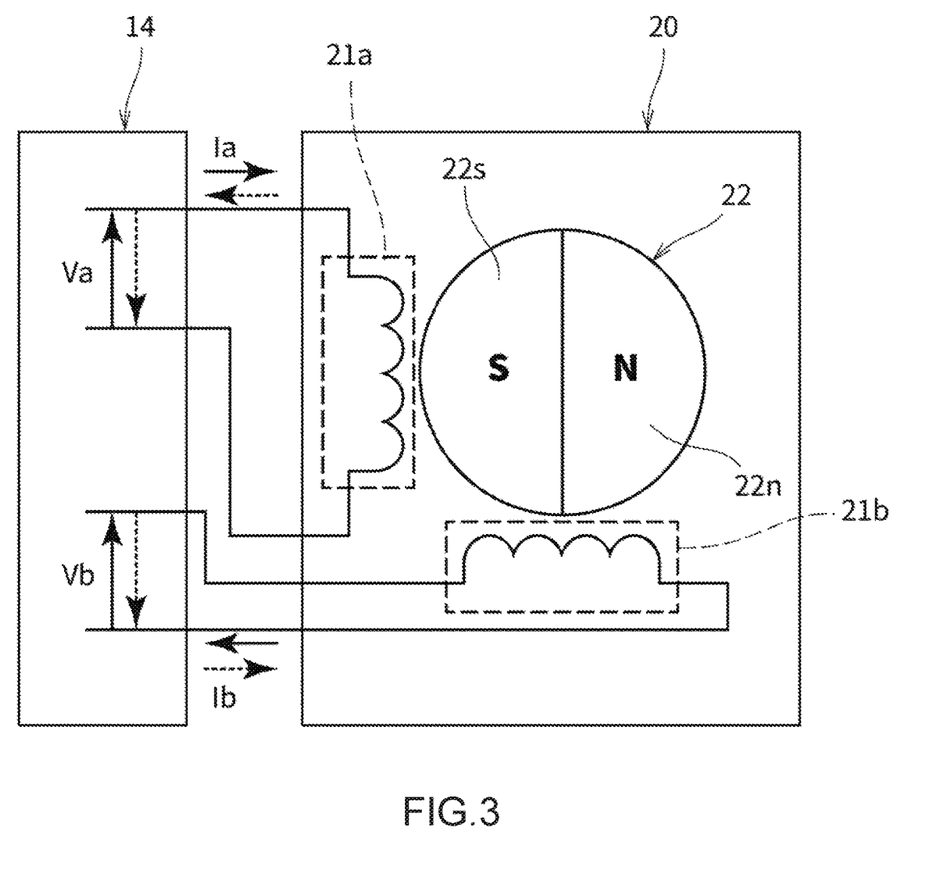
FIG. 3 is a diagram schematically illustrating a circuit configuration of a stepping motor.

FIG. 3 is a diagram schematically illustrating a circuit configuration of the stepping motor 20.

As illustrated in FIG. 3, the stepping motor 20 includes two coils 21a and 21b, a rotor 22, and a plurality of stator yokes (unillustrated).

Each of the coils 21a and 21b is a coil exciting the stator yokes. Each of the coils 21a and 21b is connected to the drive circuit 14. The coil 21a is the coil of the phase A. The coil 21b is the coil of the phase B. Coil currents of different phases are supplied to each of the coils 21a and 21b.

The rotor 22 includes a multipolar magnetized permanent magnet arranged so that the S pole 22s and the N pole 22n are alternately reversed along the circumferential direction. Note that in FIG. 3, the rotor 22 is illustrated in a simplified manner so as to include one S pole 22s and one N pole 22n. The stator yokes are disposed around the rotor 22 so as to be close to the peripheral portion of the rotor 22. The rotor 22 rotates by periodically switching the phases of the coil currents flowing in each of the coils 21a and 21b.

Here, in the present embodiment, the back electromotive voltage is measured, for example, in the following manner. When the direction of the coil currents Ia and Ib flowing in the coils 21a and 21b of one of the phase A and the phase B changes, the CPU 122 temporarily stops applying a pulse voltage to the coils 21a and 21b (stop period). Then, the back electromotive voltage measuring unit 126 measures the back electromotive voltage induced in the coils 21a and 21b of the phase to which the application of the pulse voltage is stopped during such a stop period individually (for each phase or for each coil).

Specifically, when the polarity of the coil current Ia changes, the application of the pulse voltage to the coil 21a is stopped so that the coil current Ia becomes zero. During this stop period, a back electromotive voltage is induced in the coil 21a. In addition, when the polarity of the coil current Ib changes, the application of the pulse voltage to the coil 21b is stopped so that the coil current Ib becomes zero. During this stop period, a back electromotive voltage is induced in the coil 21b. The back electromotive voltage measuring unit 126 measures these back electromotive voltages.

More specifically, when the stepping motor 20 is driven, a pulse voltage is applied to the coils 21a and 21b by control of the CPU 122 (PWM control). Then, coil currents Ia and Ib flow in the coils 21a and 21b respectively.

The PWM control is followed by execution of a power supply stop process and a constant voltage control. For example, when the power supply stop process of the coil 21a is performed, the application of the pulse voltage to the coil 21a is stopped only for a predetermined stop period. Then, the coil current Ia becomes zero. The stop period is arbitrarily set by the CPU 122. For example, the CPU 122 may set a predetermined stop period or may receive a stop period setting from the outside of the motor controller 10. During such a stop period, the back electromotive voltage measuring unit 126 measures a back electromotive voltage induced in the coil 21*a*. The measurement result of the back electromotive voltage is outputted to the CPU 122.

Note that in the present embodiment, when the power supply stop process is performed on the coil 21*a* in this manner, the CPU 122 sets the coil voltage Vb of the coil 21*b* to a fixed voltage as the constant voltage control during the stop period. In other words, the CPU 122 sets, to the fixed voltage, all the coils other than the coil whose back electromotive voltage is to be measured during the stop period. The voltage level of the fixed voltage may be the same voltage level as an immediately preceding coil voltage (such as a power supply voltage level or a ground (GND) level) or may be a predetermined reference voltage level. Thus, for example, when the power supply stop process is performed on the coil 21*a*, the coil voltage Vb of the coil 21*b* becomes constant (in the present embodiment, for example, an input voltage level).

When the voltage level of the fixed voltage is an input voltage level and when the power supply stop process is performed on the coil 21*a*, the coil current Ib of the coil 21*b* is slightly higher than the coil current Ib during the period when the above described PWM control is performed. Since the coil voltage Vb is constant during the stop period, no noise occurs due to the application of the coil voltage Vb. As a result, no noise is superimposed on the coil voltage Va of the coil 21*a* during the stop period. Thus, an accurate back electromotive voltage induced in the coil 21*a* is measured by measuring the coil voltage Va during the stop period. As a result, an erroneous detection of a step-out state can be prevented.

When the back electromotive voltage measuring unit 126 measures the back electromotive voltage in the above described manner, the CPU 122 as the step-out state detection unit detects whether or not the stepping motor 20 is in a step-out state according to the measurement results of the back electromotive voltage.

Specifically, the CPU 122 can detect whether or not the stepping motor 20 is in a step-out state by comparing the value of the back electromotive voltage measured by the back electromotive voltage measuring unit 126 and a predetermined decision threshold. For example, when the value of the measured back electromotive voltage reaches the decision threshold, the CPU 122 determines that the stepping motor 20 is in a step-out state.

In the present embodiment, as described below, the method of controlling the stepping motor 20 includes a step-out state detection step of detecting that the stepping motor 20 is in a step-out state after the start operation of the stepping motor 20 is performed, a restart determination step of determining whether or not to perform the restart operation of the stepping motor 20 based on predetermined determination conditions when the step-out state detection step detects that the stepping motor 20 is in a step-out state, and a restart control step of controlling so as to perform the restart operation of the stepping motor 20 when the restart determination step determines to perform the restart operation. After the start operation of the stepping motor 20 is performed, the CPU 122 detects that the stepping motor 20 is in a step-out state (step-out state detection step). Then, when the step-out state detection step detects that the stepping motor 20 is in a step-out state, the CPU 122 determines whether or not to perform the restart operation of the stepping motor 20 (to perform the start operation again) based on the predetermined determination conditions (restart determination step). Then, when it is determined to perform the restart operation in the restart determination step, the CPU 122 controls so as to perform the restart operation of the stepping motor 20 (restart control step).

Note that examples of the predetermined determination conditions used by the CPU 122 as the restart determination unit include the following.

The determination conditions include a condition that the temperature measured by the temperature measuring unit 128 is lower than a preset temperature (for example, minus 30 degrees Celsius). Specifically, the determination conditions include a condition wherein the temperature of the actuator 1 or the temperature corresponding to the temperature of the actuator 1 is low (herein referred to as lower than a preset temperature).

In addition, the determination conditions include a condition wherein the input voltage of the motor controller 10 measured by the input voltage measuring unit 125 is equal to or less than a predetermined voltage (set threshold VRT; for example, 10 v).

In addition, the determination conditions include a condition wherein the distance from an initial position of the start operation of the stepping motor 20 to a position (hereinafter may be referred to as a step-out position) where it is detected that the stepping motor 20 is in a step-out state is within a predetermined distance DS. Herein, in the present embodiment, when it is detected that the stepping motor 20 is in a step-out state, the CPU 122 as the step-out position calculation unit calculates the position where the stepping motor 20 becomes in the step-out state. The step-out position is calculated, for example, based on the number of control steps, the elapsed time, and the like from the start to the detection of the step-out state, but is not limited to this.

In addition, the determination conditions include a condition wherein the number of restart operation of the stepping motor 20 performed by the CPU 122 is equal to or less than a predetermined number RN (for example, three).

The CPU 122 determines whether or not the predetermined determination conditions are satisfied. In the present embodiment, when all the conditions included in these predetermined determination conditions are satisfied, the CPU 122 determines to perform the restart operation.

Note that the CPU 122 may determine to perform the restart operation when any of the conditions included in these predetermined determination conditions is satisfied or the CPU 122 may determine to perform the restart operation when a specific condition or a plurality of conditions are satisfied.

The determination conditions are not limited to the above. The determination conditions may include other conditions or may not include any of the above conditions.

Figure 4:
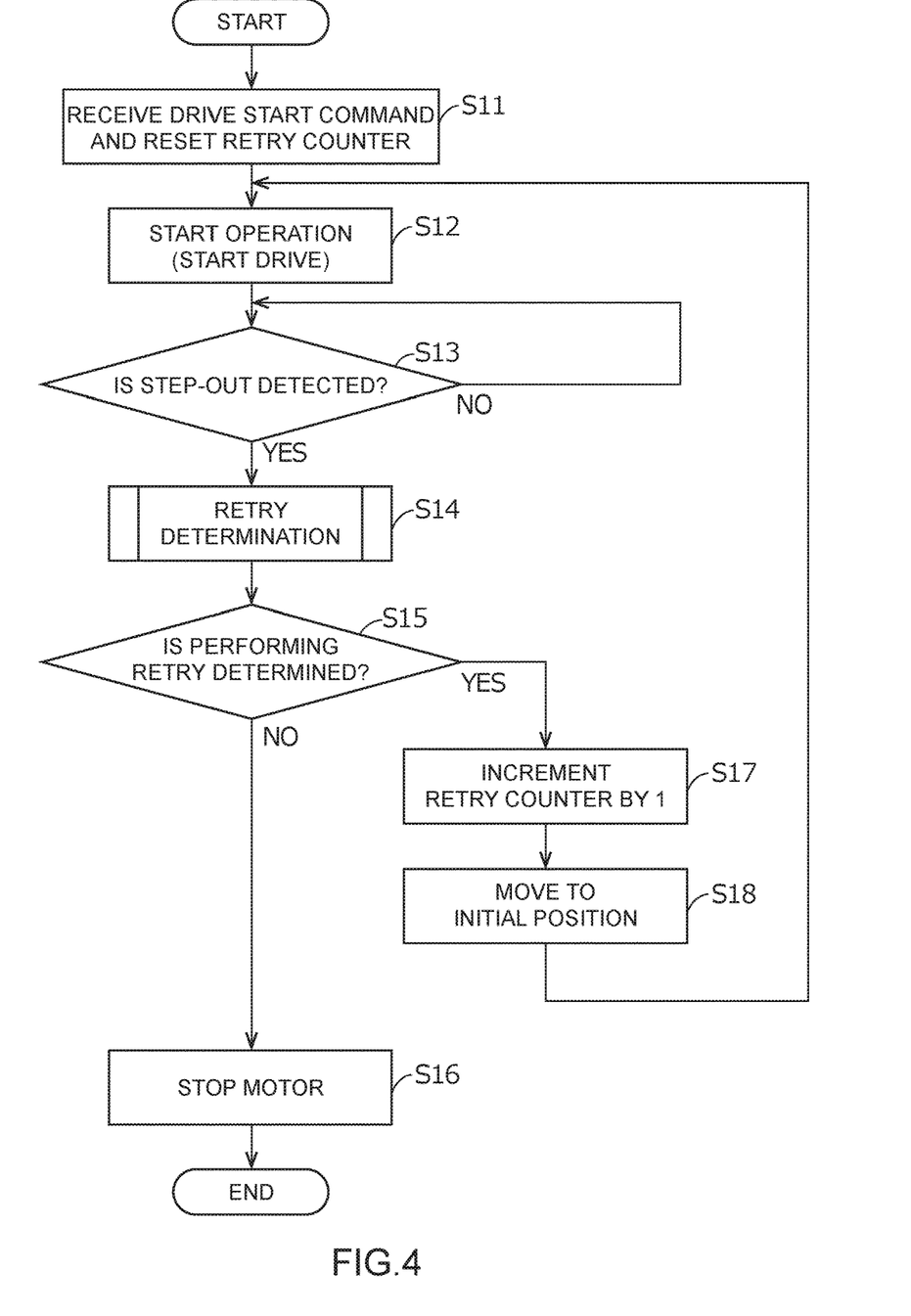
FIG. 4 is a flowchart illustrating an operation of a CPU.

FIG. 4 is a flowchart illustrating the operation of CPU 122.

As illustrated in FIG. 4, in step S11, the CPU 122 receives a drive start command. The CPU 122 resets a retry counter. The retry counter is a counter that counts the number of restart operation performed.

In step S12, in response to the drive start command, the CPU 122 outputs a control signal to the drive circuit 14 so as to start driving the stepping motor 20 (to start drive operation).

In step S13, the CPU 122 as the step-out state detection unit detects whether or not the stepping motor 20 is in a step-out state. If the stepping motor 20 is not in a step-out state (step S13: NO), the stepping motor 20 continues to be driven as it is.

When it is detected that the stepping motor 20 is in a step-out state (step S13: YES), in step S14, the CPU 122 as the restart determination unit performs the retry determination process. Specifically, the CPU 122 determines whether or not the predetermined determination conditions are satisfied. The retry determination process will be described later.

In step S15, the CPU 122 determines whether or not performing the retry is determined in the retry determination process. Specifically, the CPU 122 determines whether or not performing the restart operation of the stepping motor 20 is determined. If performing the retry is determined (restart operation is performed) (step S15: YES), the process moves to step S17. On the contrary, if performing the retry is not determined (step S15: NO), the process moves to step S16.

In step S16, the CPU 122 performs a control operation to stop the stepping motor 20. Specifically, if the step-out state is detected and if performing the restart operation is not determined, the CPU 122 stops the stepping motor 20.

Meanwhile, in step S17, the CPU 122 increments the retry counter (adds 1 to the retry counter).

In step S18, the CPU 122 as the restart control unit moves the stepping motor 20 to the initial position at which the start operation is started as a predetermined restart position. Specifically, the CPU 122 reverses the stepping motor 20 to return the rotational position of the rotor of the stepping motor 20 to the initial position. Then the process returns to step S12, where the CPU 122 as the restart control unit controls so as to perform the restart operation.

Note that the position to which the rotational position of the stepping motor 20 is to be moved is not limited to the initial position. In the present embodiment, the CPU 122 determines the restart position before performing the restart operation, and performs control so that the stepping motor 20 moves to the determined restart position. The CPU 122 normally determines that the restart position is the initial position at which the start operation is started, but the restart position may be, for example, a position returned from the initial position in a direction opposite to the rotational direction, for example, according to the number of restart operation performed (the value of the retry counter), the measured temperature, the value of the input voltage, and the like. Note also that the restart position may always be set to the initial position.

After the restart operation is performed (in second or subsequent step S12), if the step-out state is detected (step S13: YES), a similar process is performed. If the various conditions are satisfied in the retry determination in the following manner, the restart operation is repeated until it is not determined that the number of retries is equal to or less than the predetermined number RN (until NO is determined in step S24 of FIG. 5). Specifically, each time the drive start command is issued once to the stepping motor 20, the restart operation is performed up to a predetermined number RN.

Figure 5:
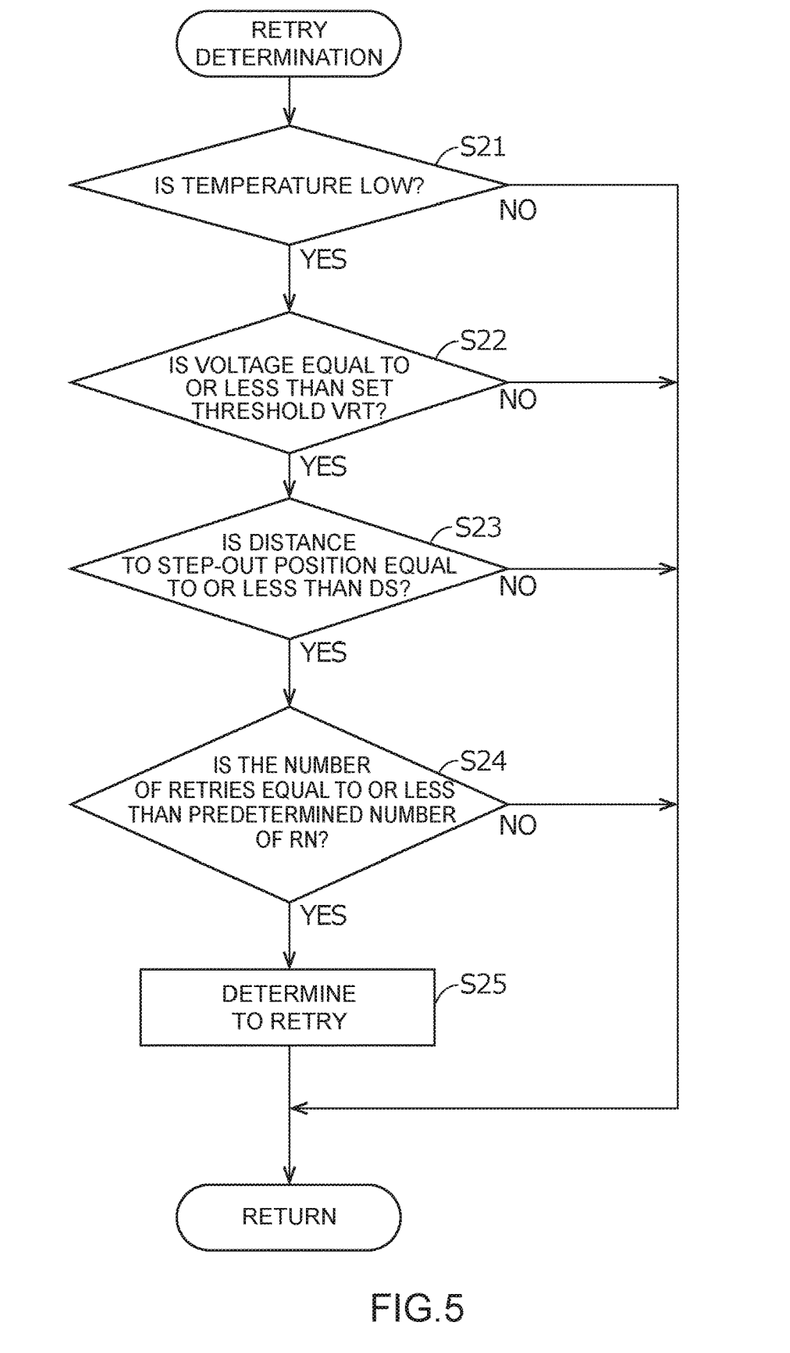
FIG. 5 is a flowchart illustrating a retry determination process.

FIG. 5 is a flowchart illustrating the retry determination process.

In the retry determination process, the CPU 122 as the restart determination unit determines whether or not the above described predetermined determination conditions are satisfied. If all the conditions are satisfied, it is determined to perform the restart operation (retry).

As illustrated in FIG. 5, in step S21, the CPU 122 determines whether or not the temperature of the actuator 1 or the temperature corresponding to the temperature of the actuator 1 is low. Specifically, the CPU 122 determines whether or not the temperature measured by the temperature measuring unit 128 is lower than the preset temperature. If it is not determined that the temperature of the actuator 1 or the temperature corresponding to the temperature of the actuator 1 is low (step S21: NO), the retry determination ends without determining to perform the restart operation (step S25).

If it is determined that the temperature of the actuator 1 or the temperature corresponding to the temperature of the actuator 1 is low (step S21: YES), in step S22, the CPU 122 determines whether or not the input voltage of the motor controller 10 measured by the input voltage measuring unit 125 is equal to or less than a predetermined voltage (set threshold VRT). If it is not determined that the input voltage is equal to or less than the predetermined voltage (step S22: NO), the retry determination ends without determining to perform the restart operation (step S25).

If it is determined that the input voltage is equal to or less than the predetermined voltage (step S22: YES), in step S23, the CPU 122 determines whether or not the distance from the initial position of the start operation to the step-out position is within the predetermined distance DS. If it is not determined that the distance from the initial position of the start operation to the step-out position is within the predetermined distance DS (step S23: NO), the retry determination ends without determining to perform the restart operation (step S25).

If it is determined that the distance from the initial position of the start operation to the step-out position is within the predetermined distance DS (step S23: YES), in step S24, the CPU 122 determines whether or not the number of retries to perform the restart operation is equal to or less than the predetermined number RN. Specifically, it is determined whether or not the value of the retry counter is equal to or less than the predetermined number RN. If it is not determined that the value of the retry counter is equal to or less than the predetermined number RN (step S24: NO), the retry determination ends without determining to perform the restart operation (step S25).

If it is determined that the number of retries is equal to or less than the predetermined number RN (step S24: YES), in step S25, the CPU 122 determines to retry (to perform the restart operation). In summary, if all the conditions from step S21 to step S24 are satisfied, it is determined to perform the restart operation, and the retry determination ends.

Note that the order of determination from step S21 to step S24 in the retry determination is not limited to this order, but the order may be changed as appropriate. In addition, each determination may be performed in parallel.

As described above, in the present embodiment, when the step-out state is detected after the start operation of the stepping motor 20 is performed, the restart operation of the stepping motor 20 is performed according to whether or not the predetermined determination conditions are satisfied.

In the actuator 1 including the stepping motor 20, when the temperature of the actuator 1 is low, the lubricating oil may be hardened (low temperature failure occurs). In such a case, the step-out state may be detected after the start operation is performed. If there is a possibility that such a low temperature failure will occur, the restart operation can be performed to eliminate the low temperature failure. The restart operation is performed after the rotational position of the stepping motor 20 is moved to the initial position or the like. Therefore, even if the lubricating oil is hardened, the stepping motor 20 can be driven by the restart operation without using a large boost power or the like so as to prevent the step-out state. In other words, in a specific case of such a low temperature, the restart operation can be performed to eliminate the low temperature failure and to increase the possibility of successful starting. Since a large boost power or the like is not used even for an application having a limited magnitude or the like of the input voltage, the stepping motor 20 can be more reliably started.

The restart operation is performed only when the temperature of the actuator 1 or the temperature corresponding to the temperature of the actuator 1 is low. Since the restart operation is performed only at a low temperature, unnecessary operation can be omitted.

The restart operation is performed only when the input voltage is lower than the predetermined voltage. When the input voltage is high, there is a relatively high possibility that the step-out state is caused by the occurrence of a low temperature failure. Therefore, the restart operation is performed only when the input voltage is lower than the predetermined voltage. Thus, unnecessary operation can be omitted.

The restart operation is not performed beyond the predetermined number RN. Examples of the predetermined number RN include setting the number of restart operations considered effective for improving the low temperature failure under a situation where a step-out state is caused by the occurrence of the low temperature failure. For this reason, when a low temperature failure to a degree low enough to be possibly eliminated by repeating the restart operation occurs, the start operation can be completed by the restart operations within the predetermined number RN. Meanwhile, when a low temperature failure to a degree too severe to be eliminated by repeating the restart operation occurs or when a step-out state occurs for other causes, unnecessary operation can be omitted by preventing the restart operation from being performed more than the predetermined number RN.

In the present embodiment, when the step-out position does not exceed the predetermined distance DS from the initial position, the restart operation is performed. If the step-out position exceeds the predetermined distance DS from the initial position, there is a high possibility that the step-out state is not caused by a low temperature failure. In light of this, when there is a high possibility that the step-out is caused by a low temperature failure, the restart operation is performed, thus allowing a reliable start of the stepping motor 20.

In the present embodiment, before the restart operation is performed, the restart position is determined. Then, after the stepping motor 20 moves to the determined restart position, the restart operation is performed. The restart position is returned from the step-out position to a position in a direction of the initial position, thus allowing an accelerated restart from the returned position and more reliable restart of the stepping motor 20 to be performed.

Note that the predetermined distance DS may be appropriately set, for example, according to the reduction gear ratio and the like of the actuator 1.

Figure 6:
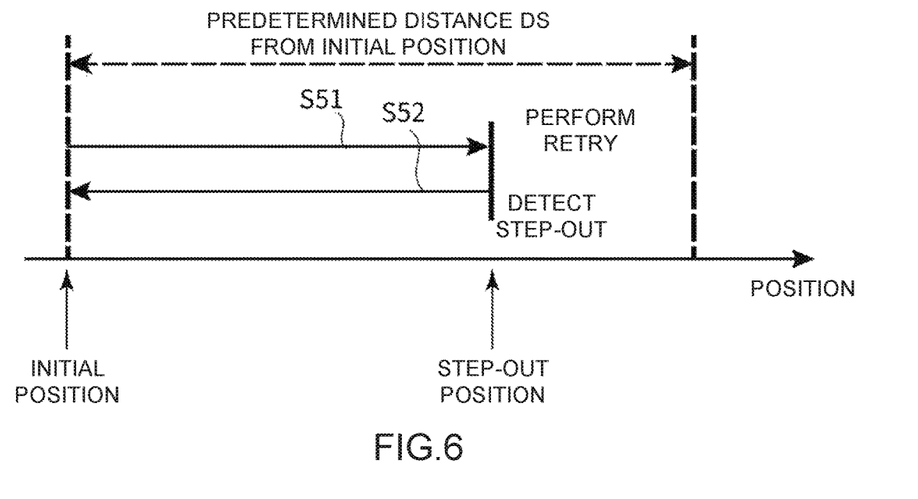
FIG. 6 is a diagram describing the operation of the motor controller when a restart operation is performed.

FIG. 6 is a diagram describing the operation of the motor controller 10 when the restart operation is performed.

In FIG. 6, the horizontal axis indicates the rotational position of the rotor of the stepping motor 20. In the figure, the dashed line on the left indicates the initial position, and the dashed line on the right indicates a position away solely by the predetermined distance DS from the initial position.

When the start operation is performed, the rotational position of the stepping motor 20 moves from the initial position to the right side (step S51). Here, assume that a step-out state is detected before the moving distance from the initial position reaches the predetermined distance DS. At this time, if all the conditions of the temperature, the input voltage, and the number of retries are satisfied, it is determined to perform the restart operation. Then, control is performed so as to reverse the stepping motor 20 to return to the initial position (step S52). When the rotational position of the stepping motor 20 returns to the initial position, the restart operation is performed and the rotational position of the stepping motor 20 moves to the right side again.

Figure 7:
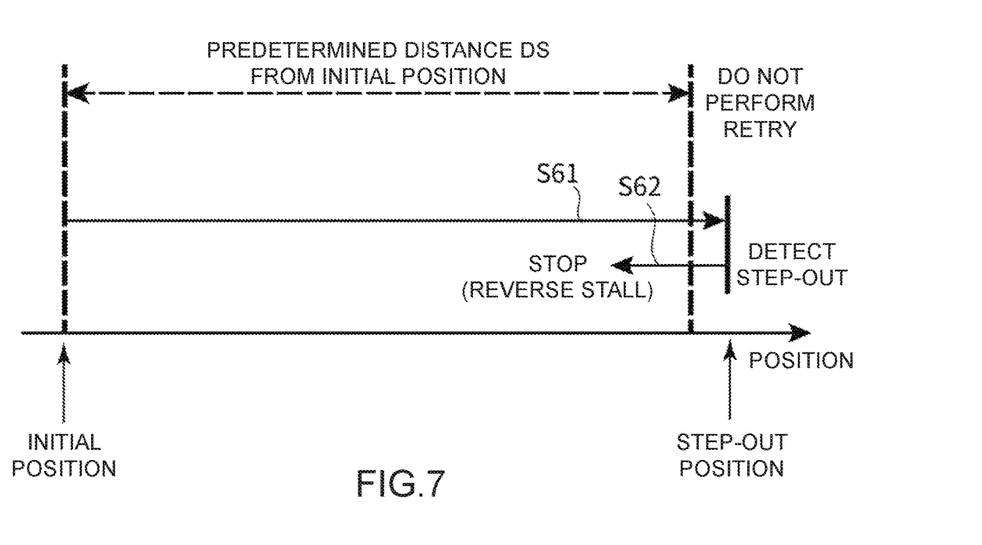
FIG. 7 is a diagram describing the operation of the motor controller when no restart operation is performed.

FIG. 7 is a diagram describing the operation of the motor controller 10 when no restart operation is performed.

In FIG. 7, like FIG. 6, the dashed lines indicate the initial position and the position away by the predetermined distance DS from the initial position.

As illustrated in FIG. 7, when the start operation is performed, the rotational position of the stepping motor 20 moves from the initial position to the right side. Then, assume that a step-out state is detected after the moving distance from the initial position exceeds the predetermined distance DS (step S61). At this time, even if all the conditions of the temperature, the input voltage, and the number of retries are satisfied, it is not determined to perform the restart operation. For this reason, the restart operation is not performed, or control is not performed so as to reverse the stepping motor 20 to return to the initial position unlike in FIG. 6. The CPU 122 performs a control operation to stop the stepping motor 20.

Note that as illustrated in FIG. 7, when the CPU 122 stops the stepping motor 20 after a step-out state is detected in this manner, the CPU 122 may perform a so-called reverse stall operation (step S62). Specifically, the stepping motor 20 is made to stop at a position slightly returned in the opposite direction from the step-out position. Thus, the stepping motor 20 and the like can be prevented from being subjected to a load or the like.

[Others]

The configuration of the actuator, the configuration of the stepping motor, the configuration of the motor controller, and other configurations described above are simply an example, and may differ from the above.

The temperature measured by the temperature measuring unit is not limited to the temperature inside the IC. The temperature near the stepping motor may be measured or a sensor is installed in another portion of the actuator to measure the temperature.

The position at which the restart operation is started is not limited to the initial position. The position may be any position. Alternatively, the restart operation may be performed at the step-out position when the previous start operation was performed.

Only a part of the motor control circuit may be configured as an integrated circuit. Alternatively, for the motor controller, a part of a portion different from the motor control circuit may be configured as an integrated circuit. Alternatively, the entire motor controller may be configured as an integrated circuit.

In the above embodiment, a back electromotive voltage is measured during the stop period of the control current to a coil of each phase and other coils are set to a fixed voltage, but the method is not limited to this. Regardless of whether or not the other coils are set to a fixed voltage, a back electromotive voltage of a coil of a specific phase may be measured during the stop period of the control current to the coil. In addition, a back electromotive voltage may be appropriately measured at various timings.

The method of detecting a step-out state is not limited to the method of using a back electromotive voltage. For example, the step-out state may be detected based on the current or voltage.

The processes in the above described embodiment may be performed by software or by a hardware circuit.

In the above described flowcharts, a specific process may be omitted, the order of the processes may be changed, and another process may be inserted.

Programs executing the processes in the above described embodiment may be provided. The programs may be stored on a recording medium such as a CD-ROM, a flexible disk, a hard disk, a ROM, a RAM, a memory card, and may be provided to a user. The programs may be downloaded to the apparatus via a communication line such as the Internet. The processes described in the flowcharts and text are executed by a CPU or the like according to the programs.

The embodiments described above should be considered to be illustrative in all respects and not restrictive. The scope of the present disclosure is defined not by the above description but by the scope of the claims, and it is intended to include all modifications within the meanings and scope equivalent to the scope of the claims.

What is claimed is:

1. A motor controller driving a stepping motor comprising:
   a step-out state detection unit configured to detect that the stepping motor is in a step-out state after a start operation of the stepping motor is performed,
   a restart determination unit configured to determine whether or not to perform a restart operation of the stepping motor based on predetermined determination conditions when the step-out state detection unit detects that the stepping motor is in a step-out state,
   a restart control unit configured to control so as to perform the restart operation of the stepping motor when the restart determination unit determines to perform the restart operation and to stop the stepping motor when the restart determination unit does not determine to perform the restart operation, and
   a step-out position calculation unit configured to calculate a position wherein the stepping motor becomes in a step-out state when the step-out state detection unit detects that the stepping motor is in a step-out state after the start operation of the stepping motor is performed, wherein
   the determination conditions of the restart determination unit include a condition that a distance from an initial position of the start operation of the stepping motor to a position where the stepping motor becomes in a step-out state, the position being calculated by the step-out position calculation unit, is within a predetermined distance.

2. The motor controller according to claim 1, further comprising
   a back electromotive voltage measuring unit configured to measure a back electromotive voltage induced in an unenergized coil of coils of a plurality of phases of the stepping motor, wherein
   the step-out state detection unit detects that the stepping motor is in a step-out state based on a measurement result of the back electromotive voltage by the back electromotive voltage measuring unit.

3. The motor controller according to claim 1, further comprising
   a temperature measuring unit configured to measure a temperature of an object driven by the stepping motor or a temperature corresponding to the temperature of the object, wherein
   the determination conditions of the restart determination unit include a condition wherein the temperature measured by the temperature measuring unit is lower than a preset temperature.

4. The motor controller according to claim 1, further comprising
   an input voltage measuring unit configured to measure an input voltage inputted to the motor controller, wherein
   the determination conditions of the restart determination unit include a condition that the input voltage of the motor controller measured by the input voltage measuring unit is equal to or less than a predetermined voltage.

5. The motor controller according to claim 1, wherein the determination conditions of the restart determination unit include a condition wherein a number of restart operations of the stepping motor performed by the restart control unit is equal to or less than a predetermined number.

6. The motor controller according to claim 1, wherein the restart control unit exercises control so that the stepping motor moves to a predetermined restart position before the restart operation of the stepping motor is performed.

7. The motor controller according to claim 6, wherein the restart position is the initial position of the start operation of the stepping motor.

8. A method of controlling a stepping motor comprising:
   a step-out state detection step of detecting that the stepping motor is in a step-out state after a start operation of the stepping motor is performed,
   a restart determination step of determining whether or not to perform a restart operation of the stepping motor based on predetermined determination conditions when the step-out state detection step detects that the stepping motor is in a step-out state,
   a restart control step of controlling to perform the restart operation of the stepping motor when the restart determination step determines to perform the restart operation and to stop the stepping motor when the restart determination unit does not determine to perform the restart operation, and
   a step-out position calculation step of calculating a position wherein the stepping motor becomes in a step-out state when the step-out state detection step detects that the stepping motor is in a step-out state after the start operation of the stepping motor is performed, wherein
   the determination conditions of the restart determination step include a condition that a distance from an initial position of the start operation of the stepping motor to a position where the stepping motor becomes in a step-out state, the position being calculated by the step-out position calculation unit, is within a predetermined distance.

* * * * *